(12) United States Patent  
Declercq et al.

(10) Patent No.: US 9,274,829 B2  
(45) Date of Patent: *Mar. 1, 2016

(54) HANDLING INTERRUPT ACTIONS FOR INTER-THREAD COMMUNICATION

(71) Applicant: International Business Machines Corporation, Armonk, NY (US)

(72) Inventors: Andrew J. Declercq, Austin, TX (US); Ahmed Gheith, Austin, TX (US); Aditya Kumar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,753

(22) Filed: Jun. 5, 2015

(65) Prior Publication Data

US 2015/0268988 A1 Sep. 24, 2015

Related U.S. Application Data

(63) Continuation of application No. 14/030,366, filed on Sep. 18, 2013.

(51) Int. Cl.
| | |
|---|---|
| *G06F 9/46* | (2006.01) |
| *G06F 7/38* | (2006.01) |
| *G06F 3/00* | (2006.01) |
| *G06F 13/24* | (2006.01) |
| *G06F 13/26* | (2006.01) |
| *G06F 9/48* | (2006.01) |
| *G06F 9/54* | (2006.01) |
| *G06F 9/52* | (2006.01) |

(52) U.S. Cl.  
CPC ............... *G06F 9/4812* (2013.01); *G06F 9/52* (2013.01); *G06F 9/542* (2013.01)

(58) Field of Classification Search  
None  
See application file for complete search history.

(56) References Cited

U.S. PATENT DOCUMENTS

| 4,805,107 | A  | * | 2/1989  | Kieckhafer et al. ........... 714/4.3 |
| 7,000,234 | B1 | * | 2/2006  | Shavit et al. .................. 719/315 |
| 7,145,913 | B2 |   | 12/2006 | Craig et al. |
| 7,293,143 | B1 |   | 11/2007 | Shavit et al. |

(Continued)

OTHER PUBLICATIONS

U.S. Appl. No. 14/030,366, 1 page.

(Continued)

*Primary Examiner* — Abdullah Al Kawsar  
*Assistant Examiner* — Bing Zhao  
(74) *Attorney, Agent, or Firm* — Francis Lammes; Stephen J. Walder, Jr.; Parashos T. Kalaitzis

(57) ABSTRACT

A mechanism is provided for handling interrupt actions for inter-thread communication. In association with a first processor thread, a thread action data structure is provided that comprises a non-blocking synchronization data structure and an internal list data structure of pending interrupts having no form of synchronization. A post of an interrupt action is received from a second processor thread to the thread action data structure associated with the first processor thread, where the interrupt action is added to the non-blocking synchronization data structure of the thread action data structure. The interrupt action is moved from the non-blocking synchronization data structure to the internal list data structure of pending interrupts for handling by the first processor thread. The internal list data structure of pending interrupts is processed to thereby handle interrupt actions moved to the internal list data structure.

6 Claims, 8 Drawing Sheets

(56) References Cited

U.S. PATENT DOCUMENTS

| | | | |
|---|---|---|---|
| 7,493,436 B2 | 2/2009 | Blackmore et al. | |
| 7,743,234 B2* | 6/2010 | Bohizic et al. | 712/225 |
| 7,844,973 B1 | 11/2010 | Dice | |
| 8,146,107 B2 | 3/2012 | Canton | |
| 8,370,842 B2 | 2/2013 | Bellows et al. | |
| 8,387,057 B2 | 2/2013 | Wilmarth | |
| 2008/0065803 A1* | 3/2008 | Utsumi | 710/260 |
| 2011/0161970 A1 | 6/2011 | Bellows et al. | |
| 2013/0014114 A1 | 1/2013 | Nagata | |

OTHER PUBLICATIONS

Engdahl, Jonathan R. et al., "Lock-Free Data Structure for Multi-core Processors", International Conference on Control, Automation and Systems, Kintex, Gyeonggi-do, Korea, Oct. 27-30, 2010, pp. 984-989.

Michael, Maged M. et al., "Simple, Fast, and Practical Non-Blocking and Blocking Concurrent Queue Algorithms*", Proceedings of the Fifteenth Annual ACM Symposium on Principles of Distributed Computing (PODC'96), .cs.rochester.edu/u/scott/papers/1996_PODC_queues.pdf, 1996, 9 pages.

Wenjie, Tang, "HSK: a Hierarchical Parallel Simulation Kernel for Multicore Platform", Ninth IEEE International Symposium on Parallel and Distributed Processing with Applications, IEEE Computer Society, Busan, Korea, May 26-28, 2011, pp. 19-24.

\* cited by examiner

HANDLING INTERRUPT ACTIONS FOR INTER-THREAD COMMUNICATION

BACKGROUND

The present application relates generally to an improved data processing apparatus and method and more specifically to mechanisms for efficiently handling interrupt actions in inter-thread communications.

In systems programming, an interrupt is a signal to a processor or, more specifically, a thread within the processor indicating an event that needs immediate attention. Such interrupts alert a thread to a high-priority condition requiring the interruption of the current code the thread is executing. The thread responds by suspending its current activities, saving its state, and executing a small program called an interrupt handler or interrupt service routine (ISR) to deal with the event. This interruption is temporary, and after the interrupt handler finishes, the thread resumes execution of the previous workload.

However, there are other interrupts utilized within a processor. That is, in multi-threaded processors, the multiple threads within the processor communicate with each other through the use of thread interrupts. While these thread interrupts do not need to be handled immediately, it is important to maintain the integrity of the data structures that are used to implement the thread interrupts so that additional performance issues are not introduced.

SUMMARY

In one illustrative embodiment, a method, in a data processing system, is provided for handling interrupt actions for inter-thread communication. The illustrative embodiments provide, in association with a first processor thread, a thread action data structure comprising a non-blocking synchronization data structure and an internal list data structure of pending interrupts. The illustrative embodiment receives a post of an interrupt action from a second processor thread to the thread action data structure associated with the first processor thread. In the illustrative embodiment, the interrupt action is added to the non-blocking synchronization data structure of the thread action data structure. The illustrative embodiment moves the interrupt action from the non-blocking synchronization data structure to the internal list data structure of pending interrupts for handling by the first processor thread. The illustrative embodiment processes the internal list data structure of pending interrupts to thereby handle interrupt actions moved to the internal list data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Again, threads within a processor communicate with each other through thread interrupts. Dedicated interrupt communication lines between threads allow for this communication to be extremely efficient. This inter-thread communication line in a multi-threaded host environment generally involves using data structures, such as queues and blocking synchronization. While interrupts do not need to be handled immediately, the blocking synchronization is important to maintain the integrity of the data structures. This blocking synchronization in turn introduces overhead which may cause performance issues.

The illustrative embodiments provide an implementation of a queue structure for each thread in a multi-threaded processor that includes both a non-blocking queue and an internal list of pending interrupts. Processor threads post interrupt actions to other processor thread's queue structure causing the interrupt actions to be added to the non-blocking queue of the receiving processor thread. These interrupt actions are then moved over to the internal list at periodic intervals and are then handled by the receiving thread. As a result the receiving thread suffers minimum overhead.

Figure 1:
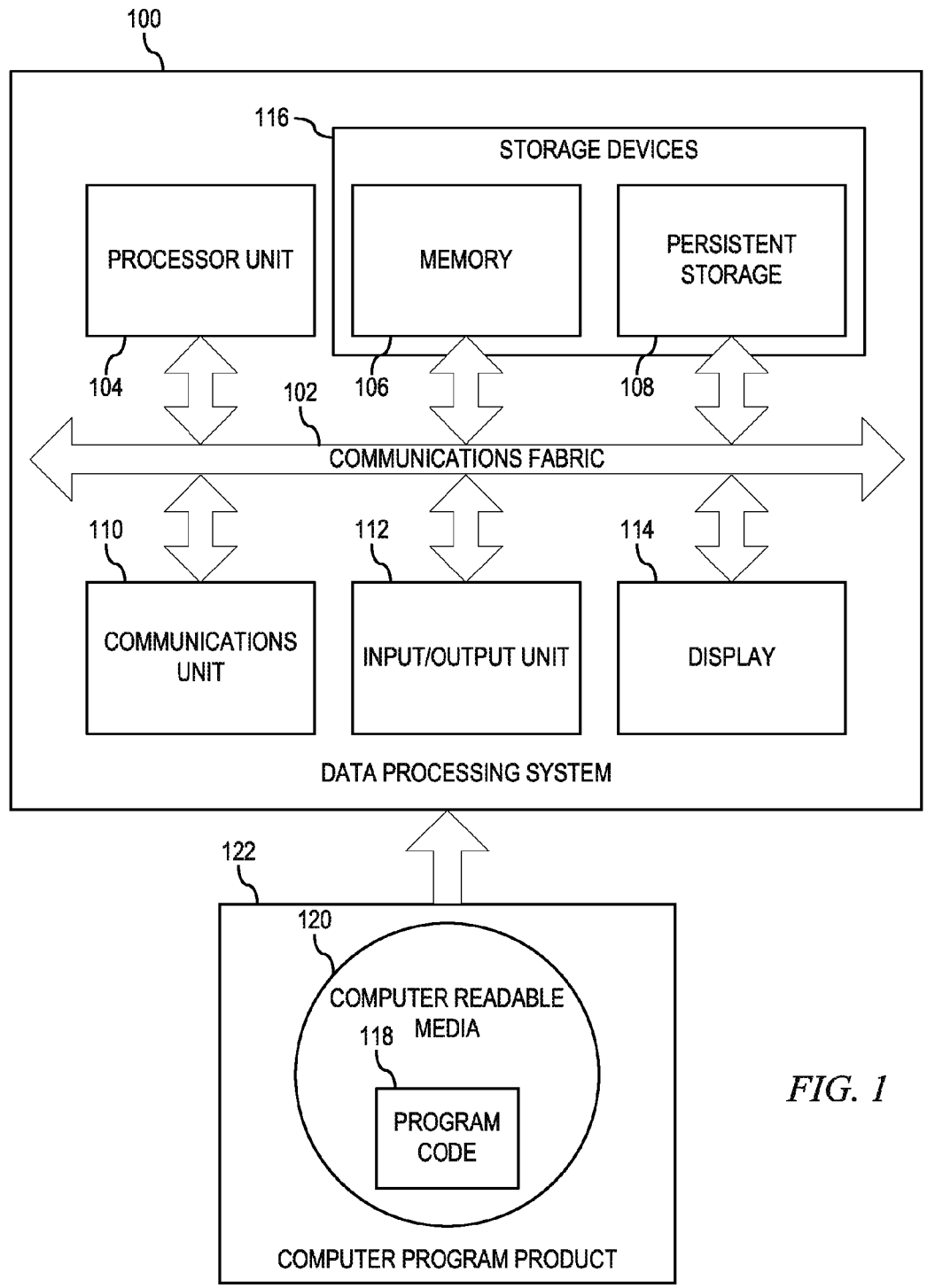
FIG. 1 depicts a block diagram of a data processing system in which illustrative embodiments may be implemented.
Figure 2:
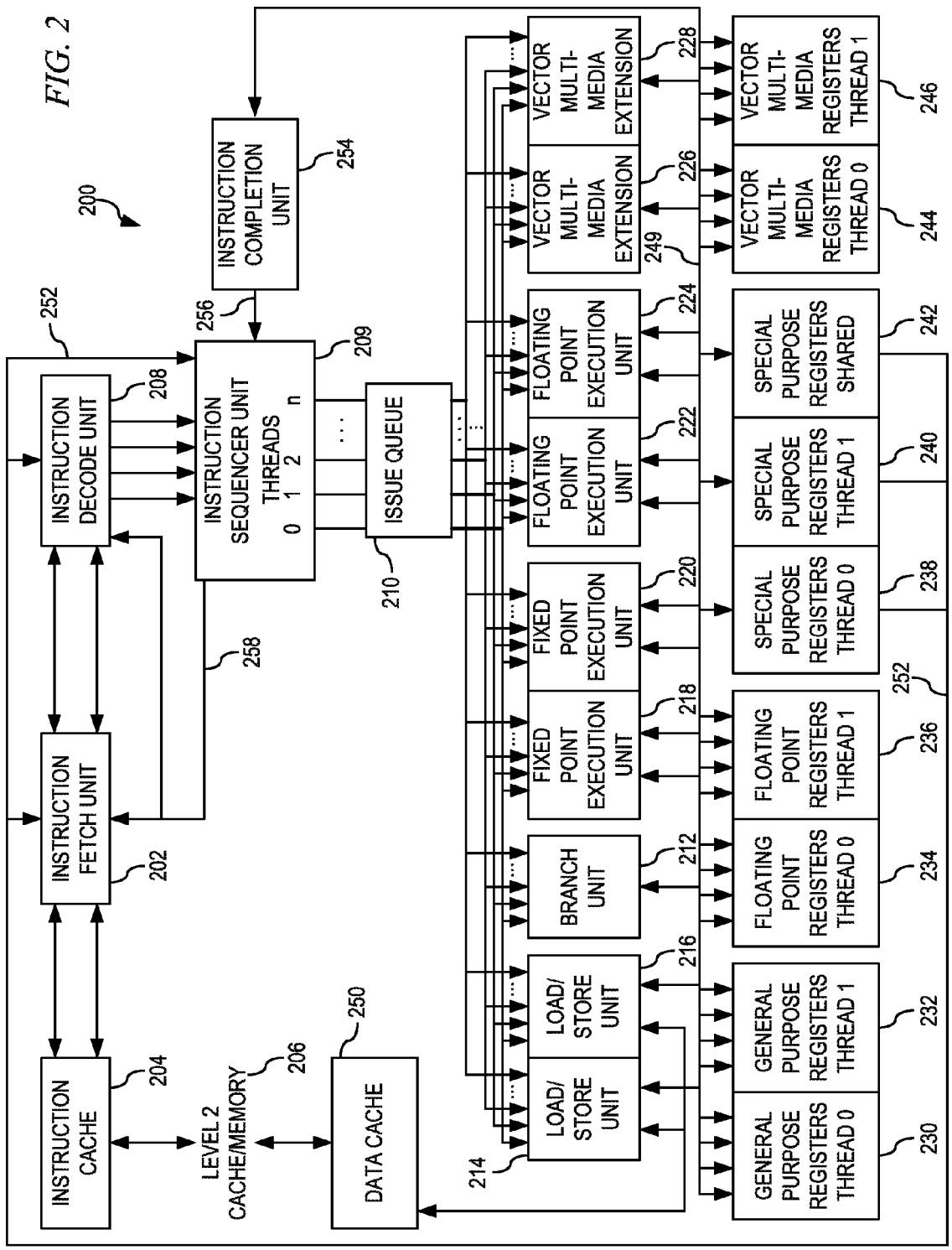
FIG. 2 depicts an exemplary block diagram of a conventional multi-threaded processor design showing functional units and registers in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of using power proxies combined with on-chip actuators to meet a defined power target, this is only an example and is not intended to state or imply any limitation with regard to the features of the present invention. To the contrary, the illustrative embodiments are intended to include distributed data processing environments and embodiments in which power proxies combined with on-chip actuators may be used to meet a defined power target.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form. In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Referring to FIG. 2, an exemplary block diagram of a conventional multi-threaded processor design showing functional units and registers is depicted in accordance with an illustrative embodiment. Processor 200 may be implemented as processing unit 104 in FIG. 1 in these illustrative examples. Processor 200 comprises a single integrated circuit superscalar microprocessor with multi-thread simultaneous multithreading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for multiple threads at the same time. Instruction decode unit 208 decodes multiple instructions for the multiple threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across the threads, meaning that execution units 212, 214, 216, 218, 220, 222, 224, 226, and 228 may receive instructions from any of the threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from any of the threads. Execution units 212, 214, 216, 218, 220, 222, 224, 226, and 228 are connected to ARFs 230, 232, 234, 236, 238, 240, 242, 244, and 246 through internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with multi-thread simultaneous multi-threading (SMT) that may also be operated in a single threaded mode, the illustrative embodiments are not limited to such microprocessors. That is, the illustrative embodiments may be implemented in any type of processor using a pipeline technology.

Figure 3:
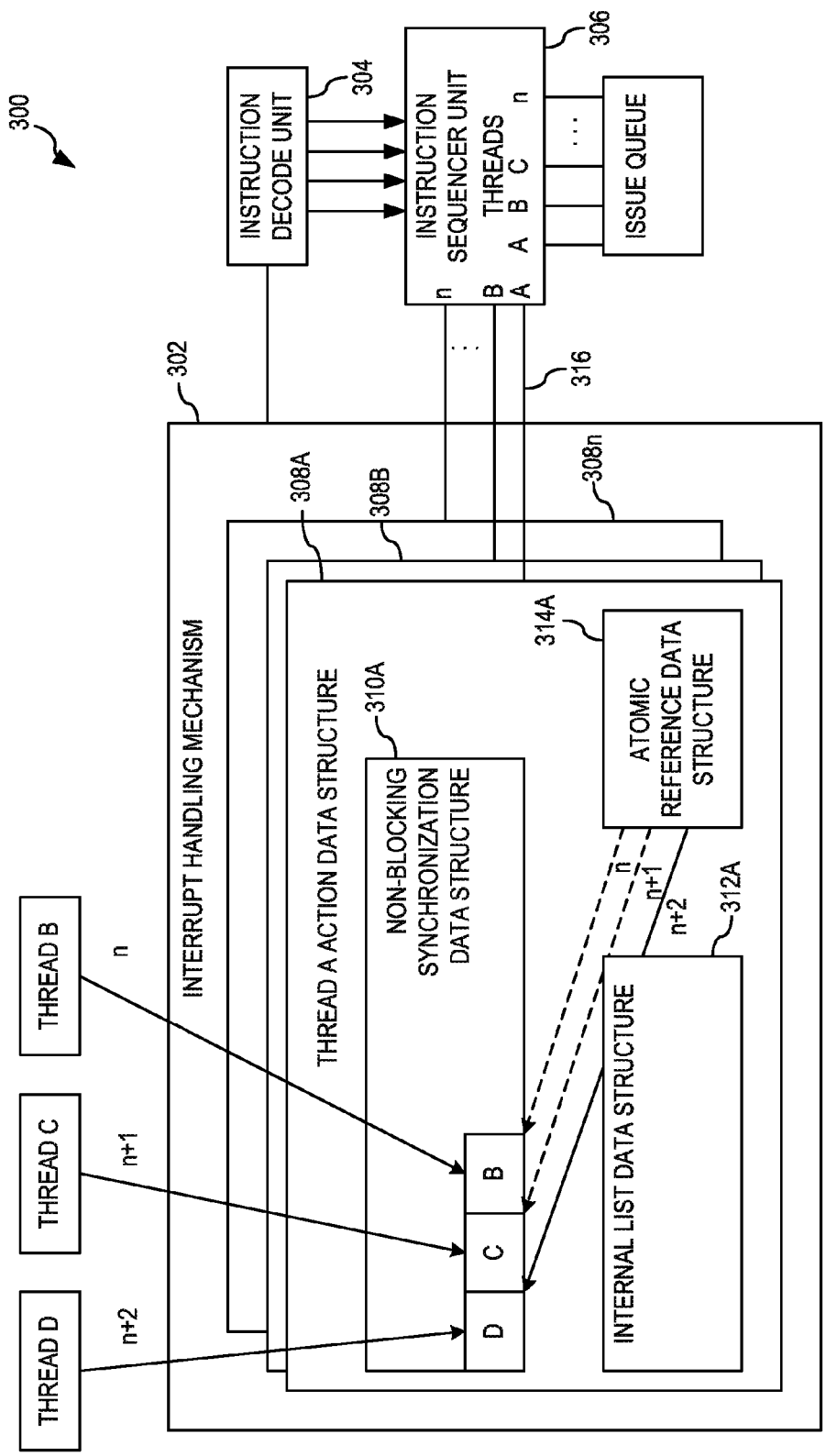
FIG. 3 depicts an interrupt handling mechanism for efficiently handling interrupt actions in inter-thread communications in accordance with an illustrative embodiment.

FIG. 3 depicts an interrupt handling mechanism for efficiently handling interrupt actions in inter-thread communications in accordance with an illustrative embodiment. Processing unit 300 comprises interrupt handling mechanism 302 coupled to instruction decode unit (IDU) 304 and instruction sequencer unit (ISU) 306, such as IDU 208 and ISU 209 of FIG. 2, respectively. Interrupt handling mechanism 302 comprises a set of thread action data structures 308A-308n, one thread action data structure 308 for each of a set of threads A, B, C, ..., n in ISU 306 of processing unit 300. Each thread action data structure 308 of the set of thread action data structures 308A-308n further comprises its own respective non-blocking synchronization data structure 310A-310n and internal list data structure 312A-312n. Further, each thread of the set of threads A, B, C, ..., n is coupled to the non-blocking synchronization data structure 310 of the other threads via dedicated interrupt communication lines 316, such that a given thread has reference to all other threads so that a given thread may send an interrupt to any other thread. For example, thread A is coupled to the non-blocking synchronization data structure 310B-310n of threads B, C, ..., n.

When a thread, for example thread B, posts an interrupt action at time n to another thread, for example thread A, thread B posts the interrupt action to the non-blocking synchronization data structure 310A of thread A. Further, at the same time as the interrupt action is being posted to non-blocking synchronization data structure 310A, interrupt handling mechanism 302 also updates the head pointer of atomic reference data structure 314A associated with non-blocking synchronization data structure 310A to reference the newly posted interrupt in non-blocking synchronized data structure 310A. Thus, the posting of the interrupt action to the non-blocking synchronization data structure and the updating of the head pointer of the atomic reference data structure are one "atomic" operation. As subsequent interrupt actions are posted at time n+1 and time n+2 to thread A and non-blocking synchronization data structure 310A, for example from threads C and D, interrupt handling mechanism 302 updates the head pointer of atomic reference data structure 314A to point to the latest posted interrupt action. Thus, when thread C posts its interrupt action at time n+1 to non-blocking synchronization data structure 310A, interrupt handling mechanism 302 updates the head pointer of atomic reference data structure 314A to point to interrupt action from thread C. However, once thread D posts its interrupt action at time n+2 to non-blocking synchronization data structure 310A, interrupt handling mechanism 302 updates the head pointer of atomic reference data structure 314A to point to interrupt action from thread D. Therefore, so that non-blocking synchronization data structure 310A is non-blocking, non-blocking synchronization data structure 310A utilizes atomic reference data structure 314A to track the head of the interrupts added to non-blocking synchronization data structure 310A.

At periodic intervals, each thread in the set of threads A, B, C, ..., n checks for incoming interrupt actions. Thus, at the end of a periodic interval, thread A, for example checks non-blocking synchronized queue 310A for incoming interrupt actions utilizing the head pointer of atomic reference data structure 314A. If thread A identifies one or more interrupt actions in non-blocking synchronization data structure 310A, thread A moves the interrupt action identified by the head pointer of atomic reference data structure 314A (interrupt action from thread D at time n+2) to internal list data structure 312A. Upon movement of interrupt action from thread D to internal list data structure 312A, interrupt handling mechanism 302 atomically advances the head pointer of atomic reference data structure 314A to the next most recently posted interrupt action in non-blocking synchronization data structure 310A (interrupt action from thread C at time n+1).

Since atomic reference data structure 314A is atomic, if a thread, for example thread E, attempts to post a new interrupt action at the same time interrupt handling mechanism 302 is updating the head pointer of atomic reference data structure 314A due to a move of an interrupt action to internal list data structure 312A, the thread E may be limited in its actions. That is, if thread A is moving an interrupt action identified by the head pointer of atomic reference data structure 314A (interrupt action from thread D at time n+2) from non-blocking synchronization data structure 310A to internal list data structure 312A, interrupt handling mechanism 302 blocks thread E from posting the interrupt action at time n+3 to non-blocking synchronization data structure 310A as well as blocking an update the head pointer of atomic reference data structure 314A until after the interrupt handling mechanism 302 atomically advances the head pointer of atomic reference data structure 314A to the next most recently posted interrupt action in non-blocking synchronization data structure 310A. In either case, once interrupt handling mechanism 302 atomically advances the head pointer of atomic reference data structure 314A to the next most recently posted interrupt action in non-blocking synchronization data structure 310A, thread E may then post the interrupt action at time n+4 to non-blocking synchronization data structure 310A (if not already done) as well as allowing interrupt handling mechanism 302 to update the head pointer at time n+4 of atomic reference data structure 314A to point to the interrupt action from thread E.

While it may be rare that thread A is moving an interrupt action from non-blocking synchronization data structure 310A to internal list data structure 312A at a same time thread E is attempting to post an interrupt action to non-blocking synchronization data structure 310A and thus interrupt handling mechanism 302 attempting to update the actions from thread A and thread E to atomic reference data structure 314A at a same time, such occurrences should be minuscule. Regardless, the above embodiments provide for any subsequent interrupt action to be posted in a next time cycle and thus provide extreme performance gains over traditional synchronization implementations that cause overhead even if there is no contention for a shared resource.

Once thread E has posted the interrupt action to non-blocking synchronization data structure 310A at time n+4 and interrupt handling mechanism 302 has updated atomic reference data structure 314A to point to interrupt action from thread E at time n+4, then at time n+5, thread A moves interrupt actions associated with threads E, C, and B from non-blocking synchronization data structure 310A to internal list data structure 312A. Further, once thread A moves all the interrupts to internal list data structure 312A, thread A iterates through all the interrupts without any synchronization overhead servicing them as necessary.

Note that it is also possible for thread A to service the interrupt from thread D at time n+4 while thread E is posting its interrupt signal at time n+4 instead of waiting the rest of the interrupt actions to be posted at time n+5. The basic idea is that internal list data structure 312A will be updated at the end of each periodic interval and service the interrupts found in non-blocking synchronization data structure 310A. The timing may end up causing certain interrupts to get missed until the next time thread A decides to populate internal list data structure 312A. This helps improve performance for thread A by not having thread A block waiting for all possible available interrupts at any given time.

Figure 4A:
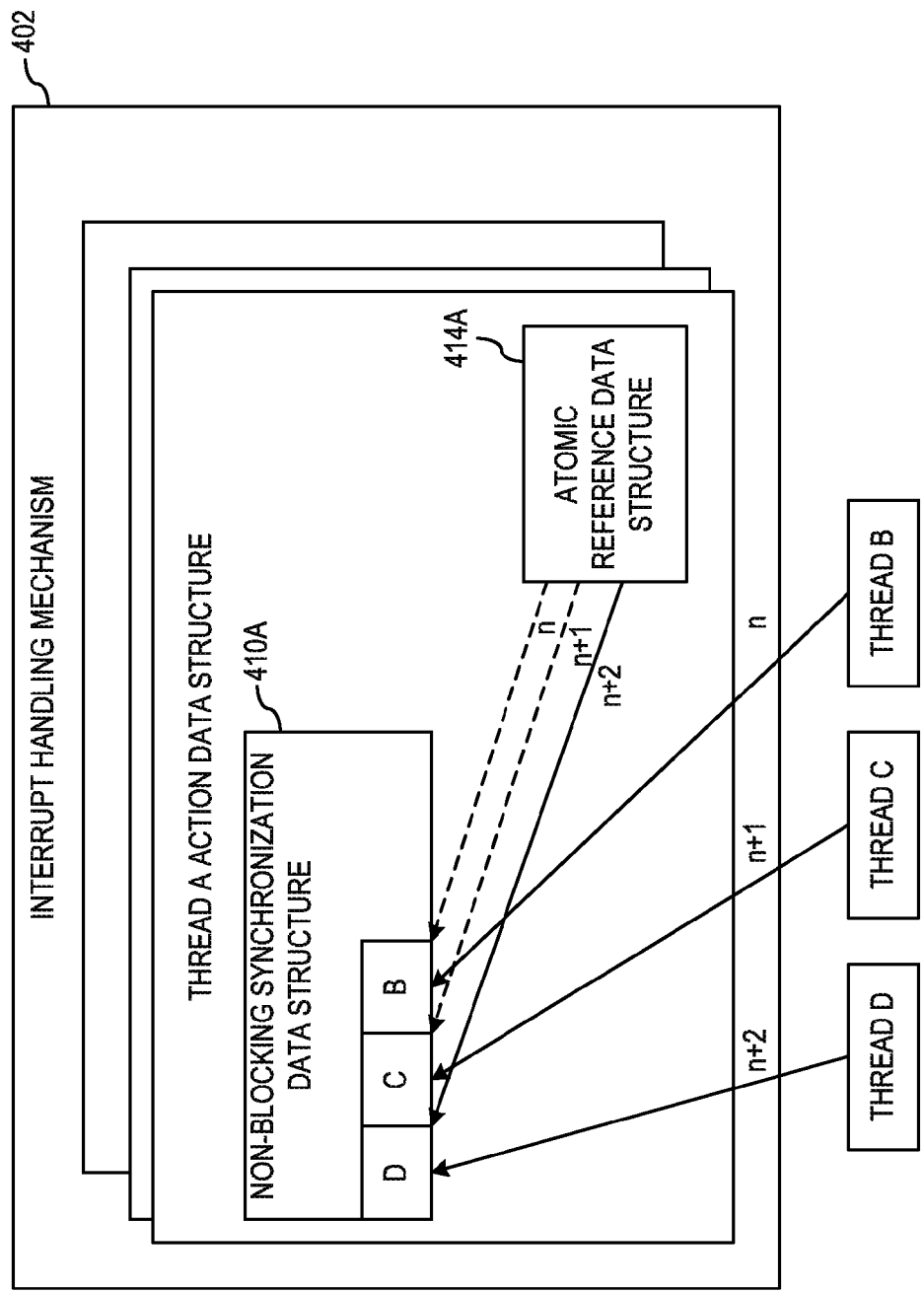
FIG. 4A depicts an example of posting interrupt actions in accordance with an illustrative embodiment.

FIG. 4A depicts an example of posting interrupt actions in accordance with an illustrative embodiment. In this example, threads B, C, and D post interrupt actions to non-blocking synchronization data structure 410A associated with thread A at times n, n+1, and n+2 respectively. As a result, interrupt handling mechanism 402 updates the head pointer of atomic reference data structure 414A to point to interrupt action from thread B at time n, updates the head pointer of atomic reference data structure 414A to point to interrupt action from thread C at time n+1, and updates the head pointer of atomic reference data structure 414A to point to interrupt action from thread D at time n+2.

Figure 4B:
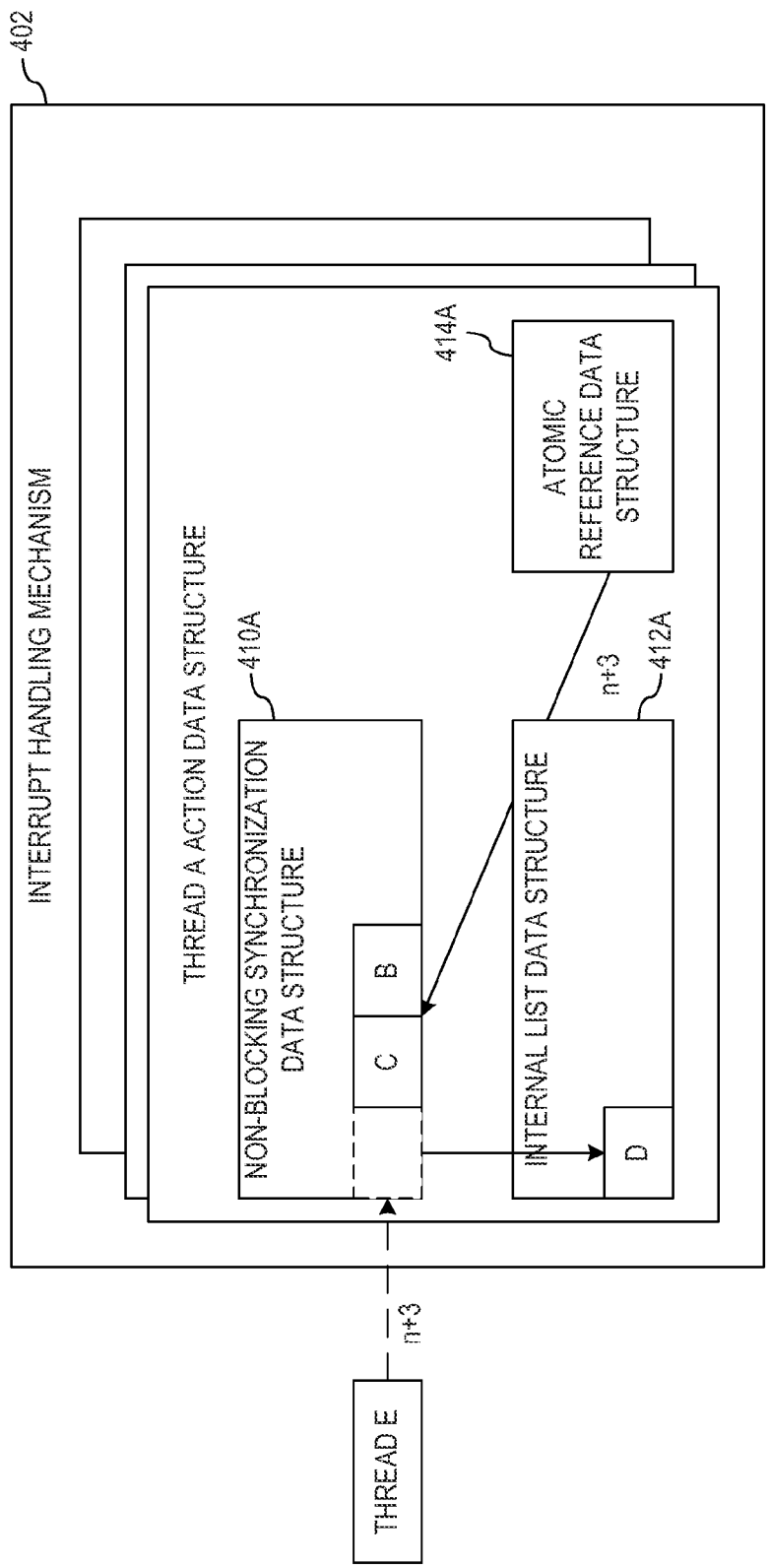
FIG. 4B depicts an example of handling a simultaneous move of an interrupt action and a posting of an interrupt action in accordance with an illustrative embodiment.

FIG. 4B depicts an example of handling a simultaneous move of an interrupt action and a posting of an interrupt action in accordance with an illustrative embodiment. At time n+3, thread A moves the interrupt action identified by the head pointer of atomic reference data structure 414A (interrupt action from thread D at time n+2 in FIG. 4A) to internal list data structure 412A. Upon movement of interrupt action from thread D to internal list data structure 412A, interrupt handling mechanism 402 atomically advances the head pointer of atomic reference data structure 414A to the next most recently posted interrupt action in non-blocking synchronization data structure 410A (interrupt action from thread C at time n+1 in FIG. 4A). Also at time n+3, thread E attempts to post a new interrupt action to non-blocking synchronization data structure 410A. However, in this example, interrupt handling mechanism 402 blocks thread E from posting the interrupt action to non-blocking synchronization data structure 410A.

Figure 4C:
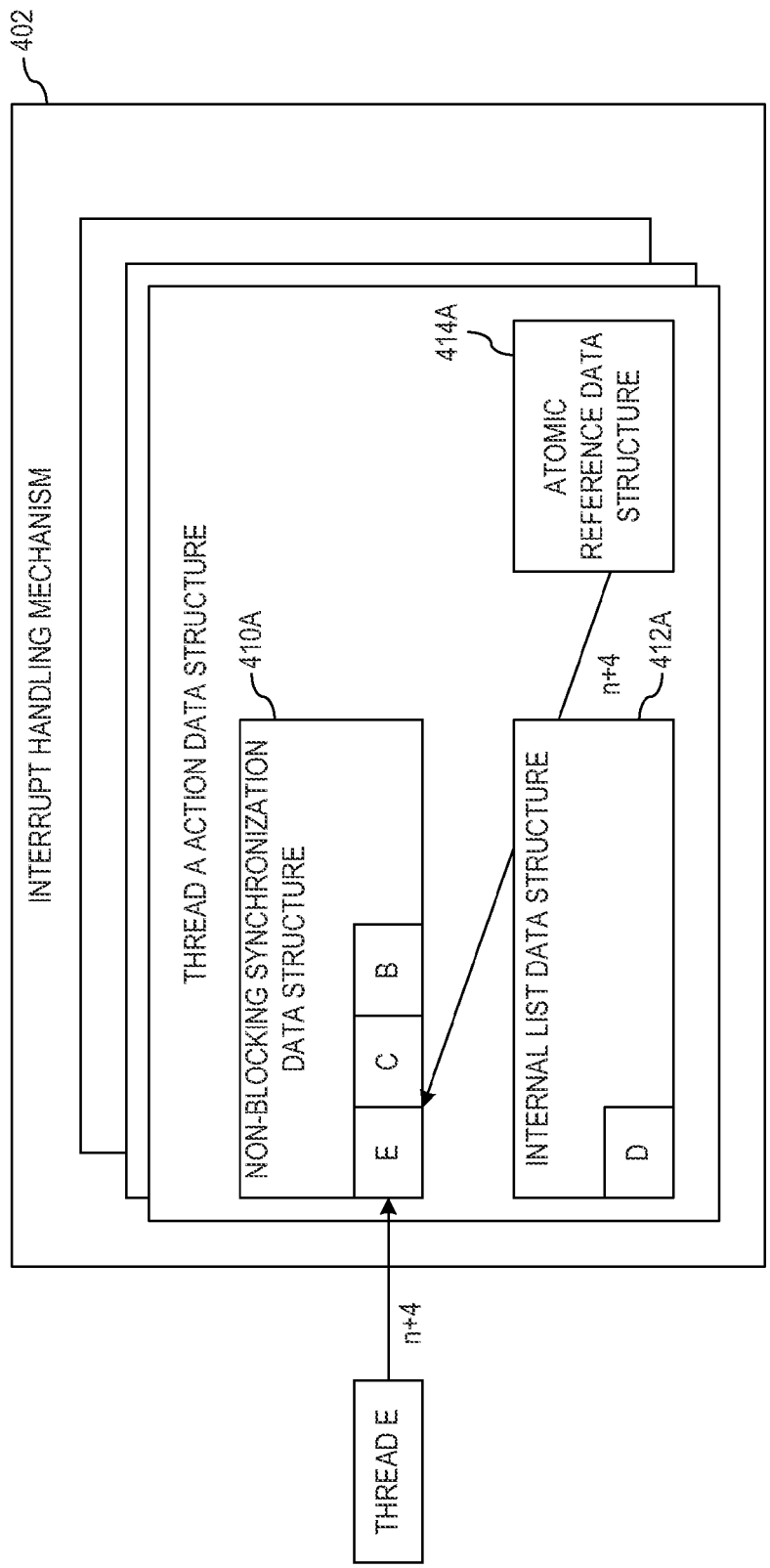
FIG. 4C depicts an example of posting a previously blocked interrupt action in accordance with an illustrative embodiment.

FIG. 4C depicts an example of posting a previously blocked interrupt action in accordance with an illustrative embodiment. In this example, once interrupt handling mechanism 402 atomically advances the head pointer of atomic reference data structure 414A to the next most recently posted interrupt action in non-blocking synchronization data structure 410A due to a move of an interrupt action identified by the head pointer of atomic reference data structure 414A (interrupt action from thread D at time n+2 in FIG. 4A) to internal list data structure 412A, at time n+4, thread E posts its interrupt action to non-blocking synchronization data structure 410A (if not already done) as well as allowing interrupt handling mechanism 402 to update the head pointer at time n+4 of atomic reference data structure 414A to point to the interrupt action from thread E.

Figure 4D:
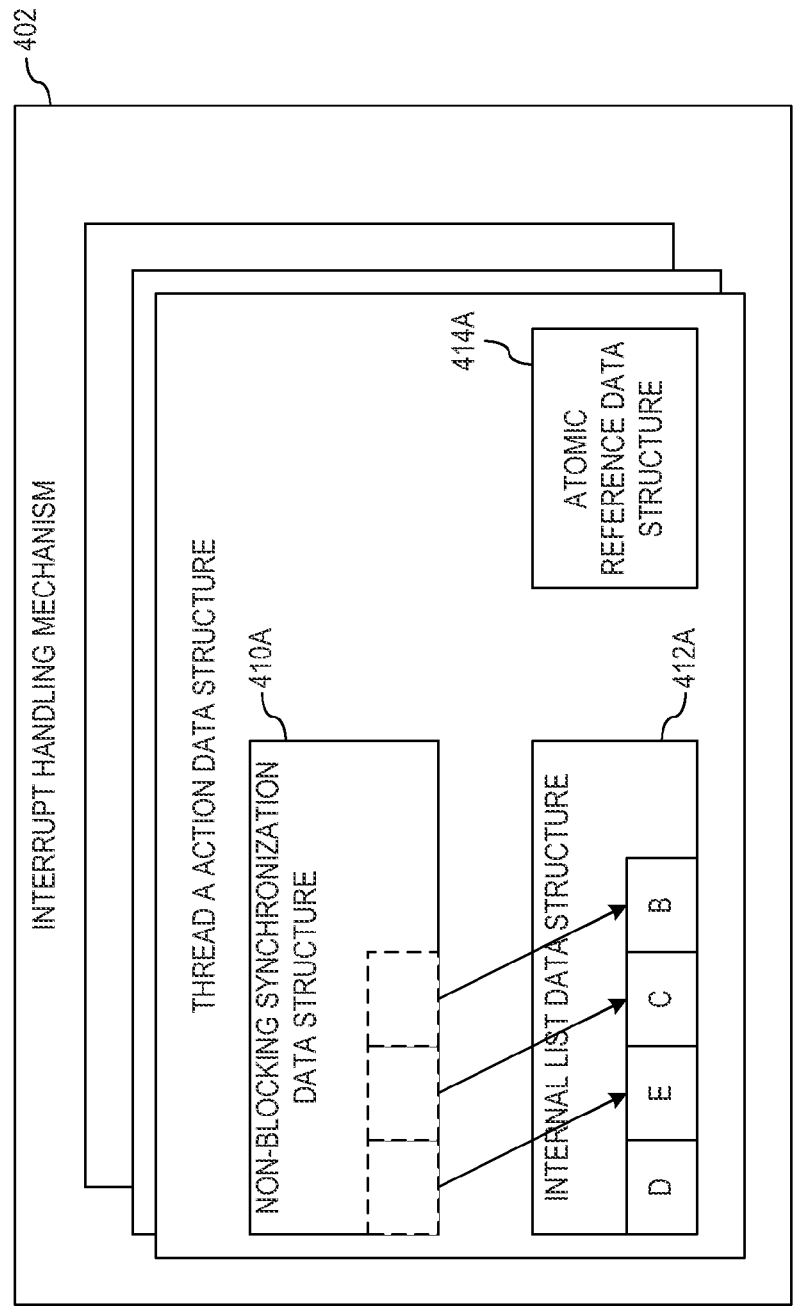
FIG. 4D depicts an example of moving any remaining interrupt actions in accordance with an illustrative embodiment.

FIG. 4D depicts an example of moving any remaining interrupt actions in accordance with an illustrative embodiment. That is, in FIG. 4B, thread A was moving interrupt actions from non-blocking synchronization data structure 410A to internal list data structure 412A but blocked thread E from posting a new interrupt action at time n+3. Thus, thread A suspended the interrupt action move at time n+4 so that thread E could post the interrupt action and interrupt handling mechanism 402 could update atomic reference data structure 414A to point to the interrupt action from thread E at time n+4. Thus, once thread E has posted the interrupt action at time n+4 and interrupt handling mechanism 402 has updated atomic reference data structure 414A to point to interrupt action from thread E at time n+4, then at time n+5, thread A moves interrupt actions associated with threads E, C, and B from non-blocking synchronization data structure 410A to internal list data structure 412A. Once thread A moves all the interrupts to internal list data structure 412A, thread A iterates through all the interrupts without any synchronization overhead servicing them as necessary.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely software embodiment (including firmware, resident software, micro-code, etc.) or an embodiment combining software and hardware aspects that may all generally be referred to herein as a "circuit," "module" or "system." That is, this invention solves a problem in current software because the invention utilizes direct and efficient interrupt lines between the threads. Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
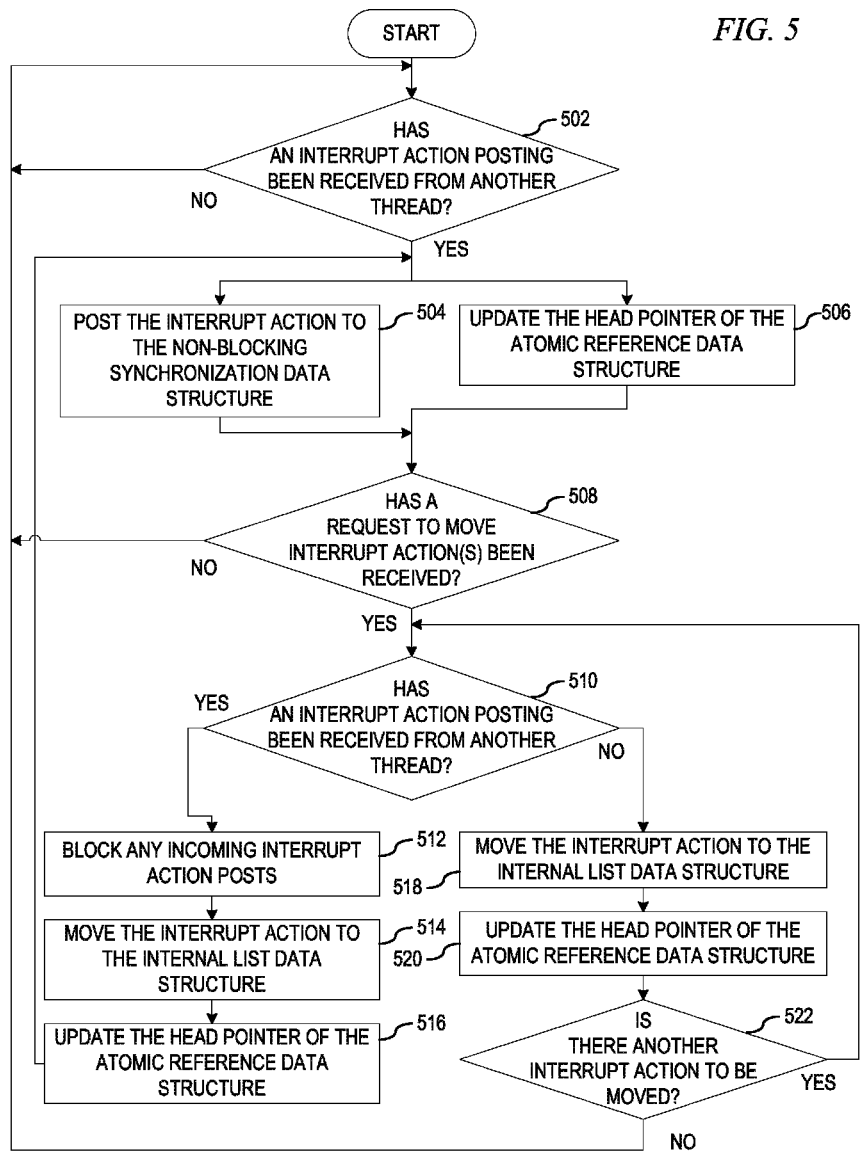
FIG. 5 depicts a flowchart of the operation performed by an interrupt handling mechanism in accordance with an illustrative embodiment.

FIG. 5 depicts a flowchart of the operation performed by an interrupt handling mechanism in accordance with an illustrative embodiment. As the operation begins, the interrupt handling mechanism associated with a first thread determines whether an interrupt action posting has been received from another thread (step 502). If at step 502 an interrupt action posting has not been received, the operation returns to step 502. If at step 502 an interrupt action posting has been received, the interrupt handling mechanism associated with the first thread posts the interrupt action to the non-blocking synchronization data structure associated with the first thread (step 504). At a same time, the interrupt handling mechanism associated with the first thread also updates the head pointer of an atomic reference data structure (step 506). Thus, the posting of the interrupt action to the non-blocking synchronization data structure and the updating of the head pointer of the atomic reference data structure are one "atomic" operation.

The interrupt handling mechanism associated with the first thread then determines whether a request has been received to move the interrupt action from the non-blocking synchronization data structure to an internal list data structure (step 508). If at step 508 a request has not been received to move interrupt action from the non-blocking synchronization data structure to the internal list data structure, the operation returns to step 502. If at step 508 a request has been received to move interrupt action from the non-blocking synchronization data structure to the internal list data structure, the interrupt handling mechanism associated with the first thread determines whether another interrupt action posting has been received from another thread (step 510).

If at step 510 another interrupt action posting has been received, the interrupt handling mechanism associated with the first thread blocks any incoming interrupt action posts (step 512). The interrupt handling mechanism associated with the first thread moves the interrupt action in the non-blocking synchronization data structure associated with head pointer of the atomic reference data structure to the internal list data structure (step 514). The interrupt handling mechanism associated with the first thread updates the head pointer of the atomic reference data structure (step 516), with the operation returning to step 504 thereafter. If at step 510 another interrupt action posting has not been received, the interrupt handling mechanism associated with the first thread moves the interrupt action in the non-blocking synchronization data structure associated with head pointer of the atomic reference data structure to the internal list data structure (step 518). The interrupt handling mechanism associated with the first thread updates the head pointer of the atomic reference data structure (step 520).

The interrupt handling mechanism associated with the first thread then determines whether there is another interrupt action in the non-blocking synchronization data structure to move to the internal list data structure (step 522). If at step 522 there is not another interrupt action in the non-blocking synchronization data structure to move to the internal list data structure, the operation returns to step 502. If at step 522 there is another interrupt action in the non-blocking synchronization data structure to move to the internal list data structure, the operation returns to step 510.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for efficiently handling interrupt actions in inter-thread communications. The illustrative embodiments provide an implementation of a queue structure for each thread in a multi-threaded processor that includes both a non-blocking queue and an internal list of pending interrupts. Processor threads post interrupt actions to other processor thread's queue structure causing the interrupt actions to be added to the non-blocking queue of the receiving processor thread. These interrupt actions are then moved over to the internal list at periodic intervals and are then handled by the receiving thread. As a result the receiving thread suffers minimum overhead.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for handling interrupt actions for inter-thread communication, the method comprising:

providing, by the data processing system, in association with a first processor thread, a thread action data structure comprising a non-blocking synchronization data structure and an internal list data structure of pending interrupts, wherein the thread action data structure associated with the first processor thread receives interrupts from other processor threads in the computing device;

receiving, by the data processing system, a post of an interrupt action from a second processor thread to the thread action data structure associated with the first processor thread, wherein the interrupt action is added to the non-blocking synchronization data structure of the thread action data structure;

moving, by the data processing system, the interrupt action from the non-blocking synchronization data structure to the internal list data structure of pending interrupts for handling by the first processor thread, wherein, responsive to receiving a post of a new interrupt action while the interrupt action is being moved from the non-blocking synchronization data structure to the internal list data structure of pending interrupt, the method further comprises:

delaying, by the data processing system, the posting of the new interrupt action to the non-blocking synchronization data structure until after the interrupt action is moved from the non-blocking synchronization data structure to the internal list data structure of pending interrupts;

responsive to the interrupt action being moved from the non-blocking synchronization data structure to the internal list data structure of pending interrupts, adding, by the data processing system, the new interrupt action to the non-blocking synchronization data structure of the thread action data structure; and updating, by the data processing system, an atomic reference to a head of the non-blocking synchronization data structure in response adding the new interrupt action from the second processor thread to the thread action data structure associated with the first processor thread, wherein the atomic reference to the head of the non-blocking synchronization data structure points to the new interrupt action in the non-blocking synchronization data structure; and processing, by the data processing system, the internal list data structure of pending interrupts to thereby handle interrupt actions moved to the internal list data structure.

2. The method of claim 1, wherein moving the interrupt action from the non-blocking synchronization data structure to the internal list data structure of pending interrupts for handling by the first processor thread further comprises:

advancing, by the data processing system, an atomic reference to a next most recently posted interrupt action in the non-blocking synchronization data structure in response to moving the interrupt action from the non-blocking synchronization data structure to the internal list data structure of pending interrupts for handling by the first processor thread.

3. The method of claim 1, further comprising:

blocking, by the data processing system, posting of interrupt actions by other threads to the non-blocking synchronization data structure while the interrupt action is being moved from the non-blocking synchronization data structure to the internal list data structure of pending interrupts.

4. The method of claim 1, further comprising:

updating, by the data processing system, the atomic reference to the head of the non-blocking synchronization data structure in response to receiving the post of the interrupt action from the second processor thread to the thread action data structure associated with the first processor thread, wherein the atomic reference points to the interrupt action from the second processor thread in the non-blocking synchronization data structure.

5. The method of claim 1, further comprising:

periodically checking, by the data processing system, the atomic reference to the head of the non-blocking synchronization data structure to determine whether there are any pending interrupt actions in the non-blocking synchronization data structure; and responsive to determining that there are pending interrupt actions in the non-blocking synchronization data structure based on results of checking the atomic reference to the head, moving, by the data processing system, the interrupt action from the non-blocking synchronization data structure to the internal list data structure of pending interrupts for handling by the first processor thread.

6. The method of claim 1, further comprising:

providing, by the data processing system, in association with all processor threads in the data processing system, a respective thread action data structure comprising a respective non-blocking synchronization data structure and a respective internal list data structure of pending interrupts.

\* \* \* \* \*